(12) United States Patent
Bateman et al.

(10) Patent No.: US 7,057,496 B2
(45) Date of Patent: *Jun. 6, 2006

(54) MULTIPLEX BUS INTERFACE SYSTEM AND METHOD FOR TRANSMITTING AND RECEIVING POWER AND DATA

(75) Inventors: David E. Bateman, Geneva, FL (US); Matthew Bush, Oviedo, FL (US)

(73) Assignee: Airpax Corporation, LLC, Cambridge, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/819,729

(22) Filed: Apr. 7, 2004

(65) Prior Publication Data

US 2005/0030165 A1 Feb. 10, 2005

Related U.S. Application Data

(63) Continuation of application No. 09/731,952, filed on Dec. 7, 2000, now Pat. No. 6,756,881.

(60) Provisional application No. 60/169,575, filed on Dec. 8, 1999.

(51) Int. Cl.
*G05B 11/01* (2006.01)

(52) U.S. Cl. .............................. 340/310.11; 340/825.59; 307/9.1

(58) Field of Classification Search ........... 340/310.01, 340/310.06, 310.02, 825.72, 825.59; 307/9.1, 307/10.1

See application file for complete search history.

(56) References Cited

U.S. PATENT DOCUMENTS

| 3,964,023 A | 6/1976 | Fauchez |
|---|---|---|
| 4,059,729 A | 11/1977 | Eddy et al. |
| 4,061,880 A | 12/1977 | Collins et al. |
| 4,071,711 A | 1/1978 | Beaupre et al. |
| 4,085,434 A | 4/1978 | Stevens |
| 4,105,871 A | 8/1978 | Ely et al. |
| 4,105,872 A | 8/1978 | Parise et al. |
| 4,160,131 A | 7/1979 | Kaul et al. |
| 4,740,957 A | 4/1988 | Cassidy et al. |
| 4,783,732 A | 11/1988 | Morton |
| 5,710,911 A | 1/1998 | Walsh et al. |
| 5,724,537 A | 3/1998 | Jones |
| 5,805,914 A | 9/1998 | Wise et al. |
| 5,842,033 A | 11/1998 | Wise et al. |
| 5,909,193 A | 6/1999 | Phillips et al. |
| 5,987,244 A | 11/1999 | Kau et al. |
| 6,088,362 A | 7/2000 | Turnbull et al. |
| 6,229,434 B1 | 5/2001 | Knapp et al. |
| 6,326,704 B1 | 12/2001 | Breed et al. |
| 6,369,699 B1 | 4/2002 | Liu |

*Primary Examiner*—John Tweel, Jr.
(74) *Attorney, Agent, or Firm*—Allen, Dyer, Doppelt, Milbrath & Gilchrist, P.A.

(57) ABSTRACT

A multiplex bus interface enables power and data to be transmitted and received on a two wire bus. Input and output devices operate with transceivers connected to the bus to communicate with each other by placing their data on the bus within specific time slots controlled by a controller, a clock module which broadcasts data to all connected transceivers. A pulsed power waveform provides power to the transceivers and data through pulse width modulation of the pulsed waveform. Data from the transceivers is transmitted during a time slot between power pulses. Data integrity is checked by the initiating input transceiver. Errors are reported at the end of a broadcast cycle. Output transceivers use the data as appropriate for the device and condition being monitored or controlled.

1 Claim, 9 Drawing Sheets

MULTIPLEX BUS INTERFACE SYSTEM AND METHOD FOR TRANSMITTING AND RECEIVING POWER AND DATA

CROSS-REFERENCE TO RELATED APPLICATIONS

This application is a continuation application and claims priority to U.S. application Ser. No. 09/731,952 for MULTIPLEX BUS INTERFACE SYSTEM AND METHOD FOR TRANSMITTING AND RECEIVING POWER AND DATA having filing date Dec. 7, 2000 now U.S. Pat. No. 6,756,881, which itself claims the benefit of U.S. Provisional Application No. 60/169,575, filed Dec. 8, 1999, both of which are hereby incorporated herein by reference in their entireties.

FIELD OF THE INVENTION

The present invention relates to control and monitoring of multiplexed communications networks and, more particularly to multiplexing data and power transmission through a single conductor of a common bus.

BACKGROUND OF THE INVENTION

By way of example, various systems for transmitting data produced by a large number of subscribers from one location to another are known, as described in U.S. Pat. No. 4,059,729 to Eddy et al. Typically time division multiplexing is used to combine data into a multiplexed data stream and transmitted over a transmission network, including telephone lines, radio transmission equipment, and the like. As further illustrated by way of example, bus lines between peripheral devices and a central control transmit data for controlling pulsed data information through various desirable conductive paths, as described in U.S. Pat. No. 4,105,871 to Ely et al. Such multiplexing systems, and those known in the art, typically require separate wires for power, synchronizing clock pulses, and data. Other methods of transferring data with power require the use of a radio frequency carrier, which requires complex filtering and circuitry for the modulation and demodulation of the data. Further, it is well known that the number of devices that can typically be connected to a multiplexed bus is undesirably limited.

There is a need for providing a multiplexed bus system of transmitting and receiving data with a minimal number of components, which will dramatically reduce the cost of the multiplex system. Further, there is a need for such a system that will support many hundreds of transceivers for communicating with input and output devices.

SUMMARY OF THE INVENTION

In view of the foregoing background, it is therefore an object of the present invention to provide for the multiplexing of data and power to transceivers communicating on a common bus. It is further an object of the invention to provide such a multiplexing system that employs a minimum of components for reducing cost when compared to systems providing typical multiplexing functions.

These and other objects, advantages and features of the present invention are provided by a communications and control system comprising a bus having a signal wire, a transceiver electrically connected to the bus for transmitting and receiving an electrical signal through the signal wire, and a processor operable with the bus for controlling power and data delivered thereto. The controller provides the electrical signal to the transceiver through the signal wire as a pulsed waveform having a plurality of voltage pulses separated by a time slot, wherein power is delivered with each voltage pulse and absent during the time slot. Further, the controller operates to data to the transceiver through a pulse width modulation of the pulsed waveform, with the transceiver transmitting data to the signal wire of the bus during the time slot as a logical bit for reading by the controller. As a result, data is transmitted to the transceiver and received from the transceiver through the one signal wire of the bus through which the power for the transceiver is delivered.

A method aspect of the invention includes communicating and controlling a system through a single conductor by providing power to a single conductor as a voltage waveform having a pulsed operating voltage separated by a time slot wherein power is not applied to the bus during the time slot, pulse width modulating the waveform such that a first pulse width represents a logical one and a second pulse width represent a logical zero, and connecting a transceiver to the single conductor for receiving the voltage waveform therefrom for powering thereof and receiving data therefrom. Data from the transceiver is transmitted during the time slot as a logical bit. As a result, pulse width modulating the waveform transmits data to the transceiver and the logical bit data transmitted by the transceiver within the time slot can be received from the transceiver, with each being transmitted through the single conductor through which power is delivered to the transceiver.

In one embodiment, the width of the power pulse is compared to the width of the time slot, wherein a power pulse width equal to the time slot width represents a first logical bit value, and the power pulse width unequal to the time slot width represents a second logical bit value. Further, the transmitting and receiving of data is accomplished by transmitting a multiple bit scheme, wherein a single low bit indicates a start bit, transmitting a plurality of data bits following the start bit, and transmitting a final bit representative of one of a data bit and an address bit.

BRIEF DESCRIPTION OF THE DRAWINGS

One embodiment of the invention, as well as alternate embodiments, are described by way of example with reference to the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
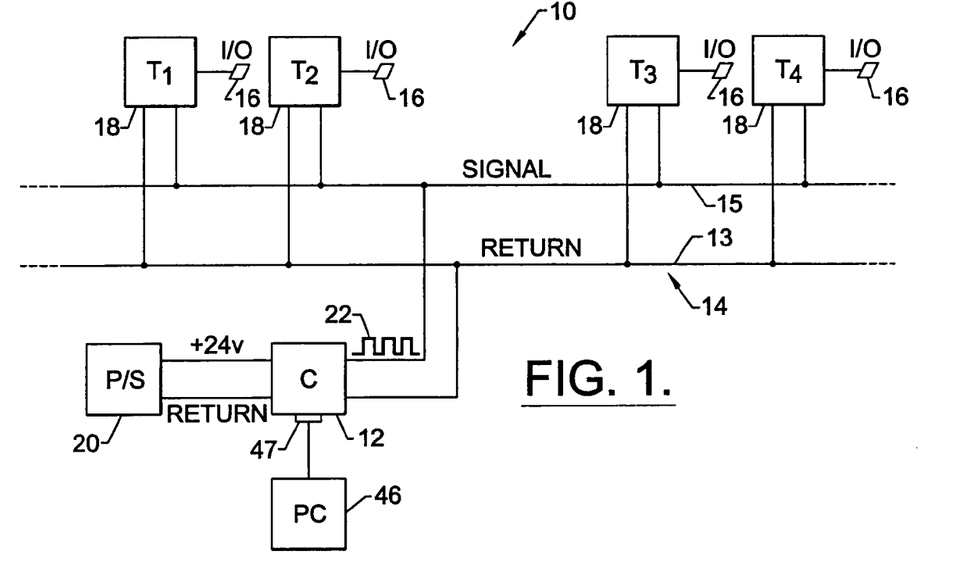
FIG. 1 is a system block diagram illustrating one embodiment of the present invention.

With reference initially to FIG. 1, one embodiment of the present invention is herein described as a communications and control system 10 includes a controller 12 which provides a multiplex bus interface for enabling power and data to be transmitted and received on a two wire bus 14 using only a single signal wire 15, the second being a return wire 13, or the like. Input and output devices 16, as will be later described in this specification by way of example, operate with transceivers 18 connected to the bus 14 for communicating with each other by placing their data on the bus at a preselected time as controlled by the controller 12 which for the embodiment of the present invention herein described, operates as a clock module which broadcasts data to all the transceivers 18 connected to the bus 14. With continued reference to FIG. 1, power is provided to the bus 14 by a power supply 20 which is connected to the controller 12 which controls the power delivered to the bus 14, and thus to the transceiver 18 through a pulsed power waveform 22, as illustrated with reference to FIG. 2A. As will be further detailed later in this section, data is provided to transceivers 18 by the controller 12 through a pulse width 24 modulation of the pulsed waveform 22. Data initiated at a transceiver 18, whether by an input/output device 16 or as may be internally programmed, is transmitted during a time slot 26 between the pulses 28 of the waveform 22 as logical one and zero bits 30, 32, respectively, as illustrated with reference to FIGS. 2B and 2C. Data integrity is checked by the initiating, input transceiver and errors are reported at the end of a broadcast cycle. Output transceivers use the data as appropriate for the device and condition being monitored or controlled.

Figure 2A:
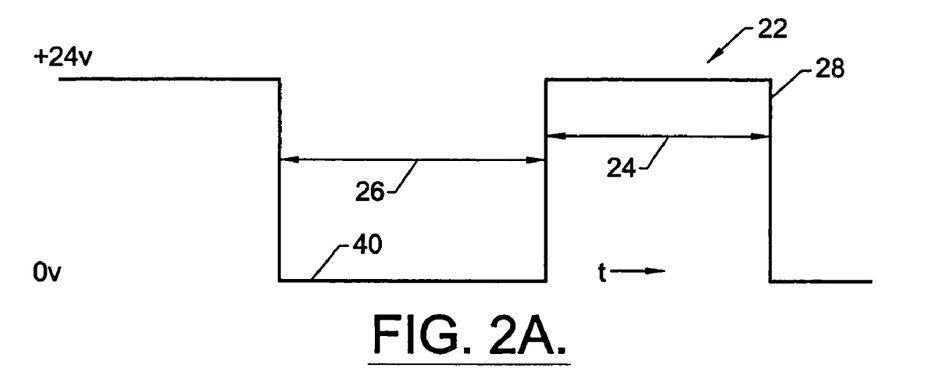
FIG. 2A is a voltage waveform illustrating a time slot between voltage pulses wherein the time slot is without a response from a transceiver.
Figure 2B:
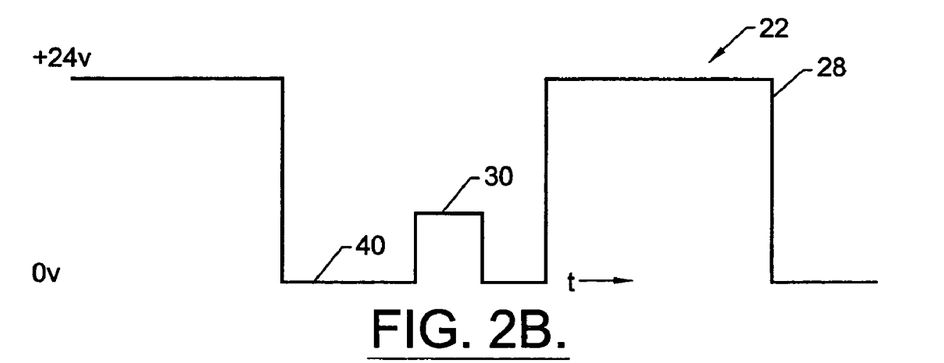
FIG. 2B is a voltage waveform illustrating a time slot between voltage pulses wherein the time slot includes a signal representative of a logical one as a response from a transceiver.
Figure 2C:
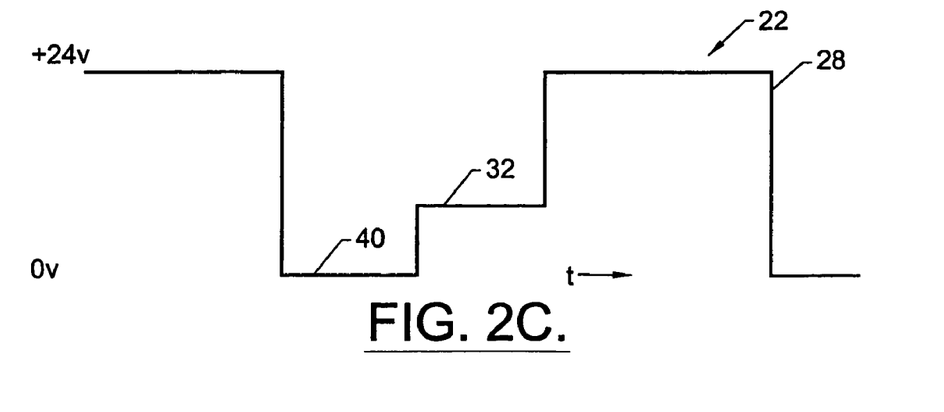
FIG. 2C is a voltage waveform illustrating a time slot between voltage pulses wherein the time slot includes a signal representative of a logical zero as a response from a transceiver.
Figure 3:
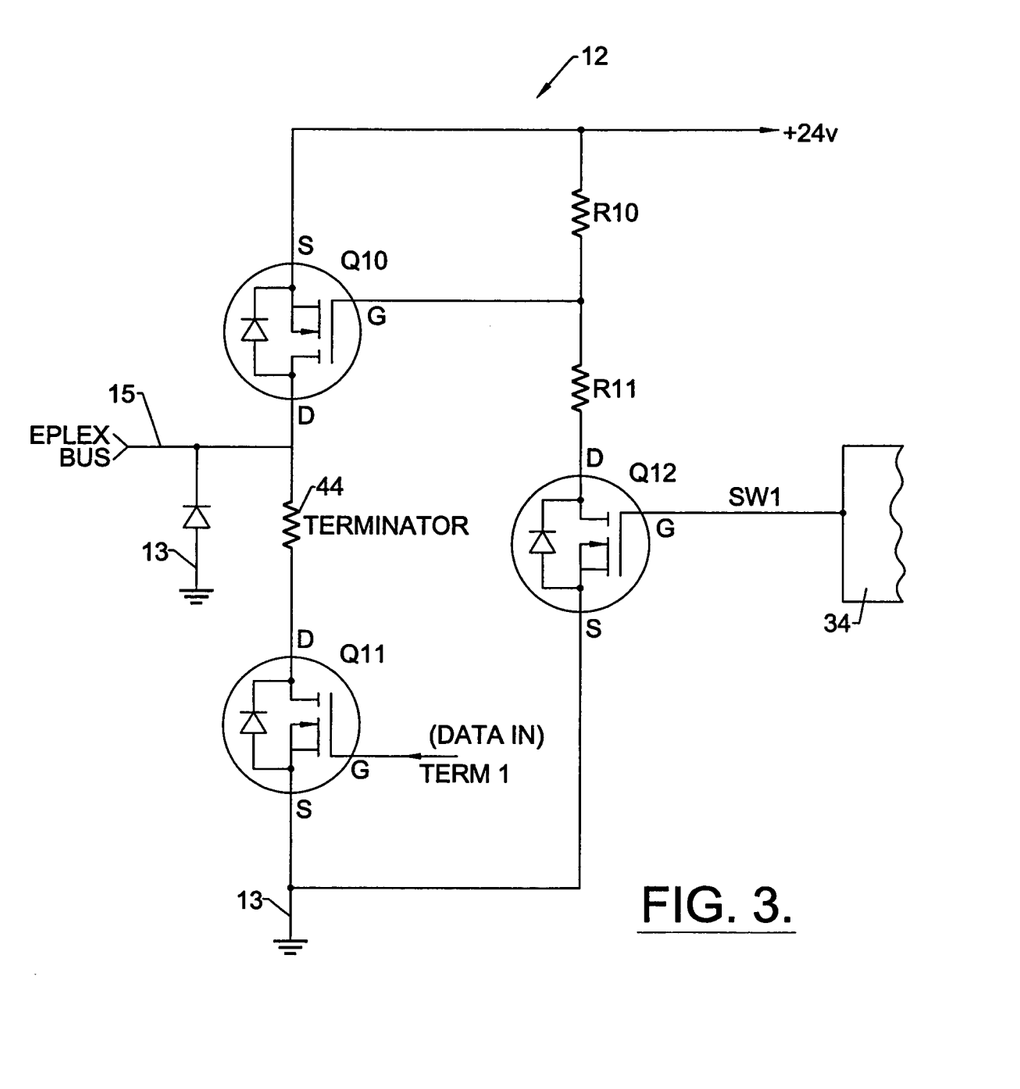
FIG. 3 is a partial schematic diagram illustrating one embodiment of a controller power switching and terminator circuit portion operable as a clock module with the system of FIG. 1.
Figure 4:
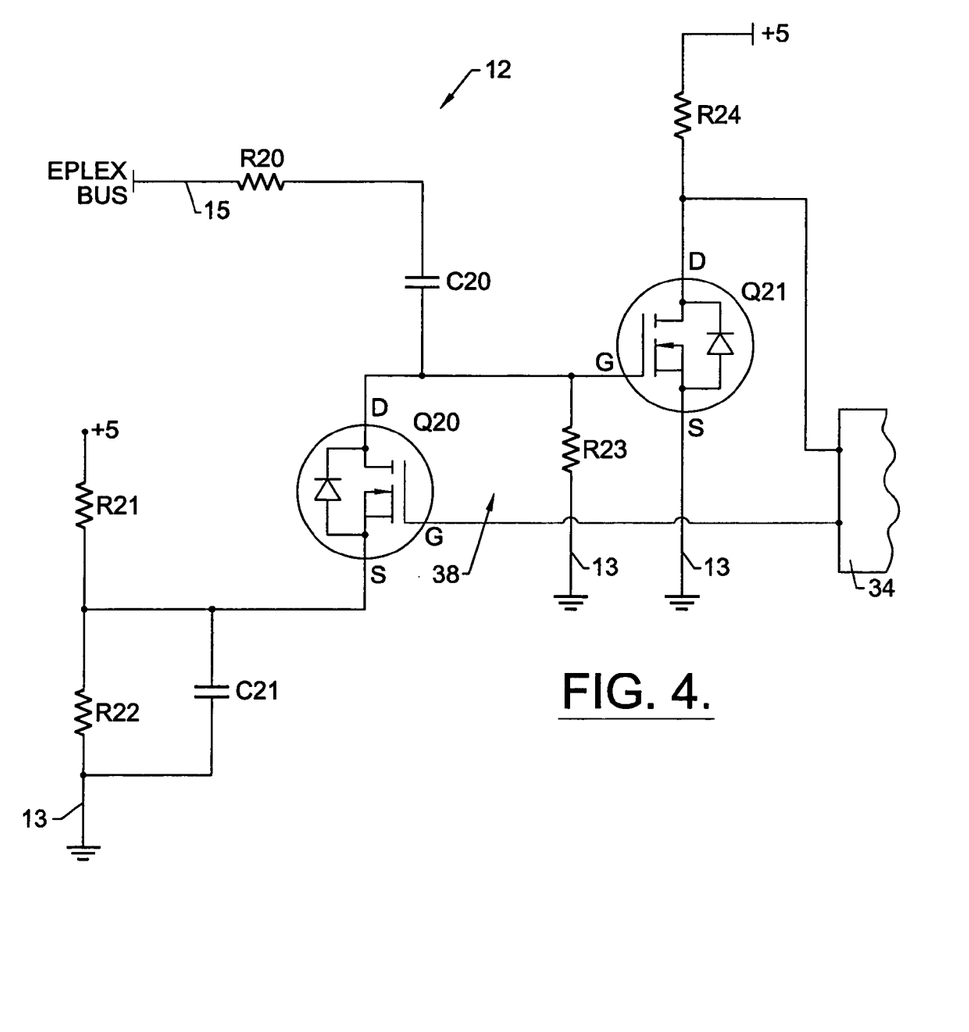
FIG. 4 is a partial schematic diagram illustrating one embodiment of a controller receiver and detector circuit portion operable as the clock module of FIG. 3.
Figure 5:
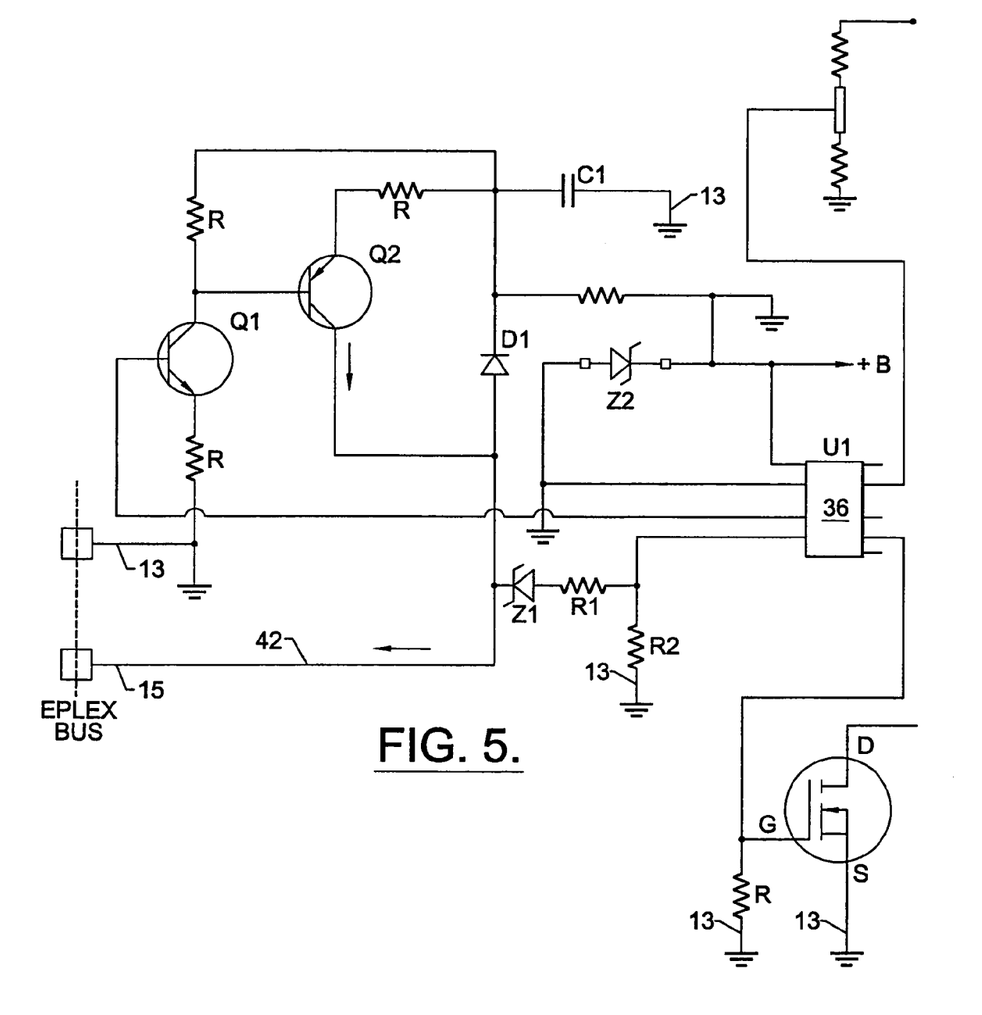
FIG. 5 is a partial schematic diagram illustrating one embodiment of a transceiver operable with the system of FIG. 1.

By way of example, and with reference to FIGS. 3–5, one embodiment of the controller 12 and transceiver 18 will now be described knowing that one skilled in the art will appreciate that alternate embodiments are possible now having the benefit of the present invention. The two wire bus 14 described by way of example with reference again to FIG. 1, provides the power from the controller 12 acting as a master, to the transceiver 18, acting as a slave. A processor 34 of the controller 12, illustrated with reference to FIGS. 3 and 4 as a microprocessor, by way of the example herein described, turns on a MOSFET switch Q12 which level translates to turn on Q10, which in turn enables power to the bus 14. Thus, the controller 12 comprises a power switch including a first semiconductor switch operable for enabling power to the bus, and a second semiconductor switch operable for controlling a time width of the voltage pulse 28 forming the power waveform 22. As will be understood by those skilled in the art, a processing element may be the microprocessor herein described by way of example, or a gate array, discrete logic, or the like for providing the processing means, without departing from the invention. With continued reference to FIG. 3, the microprocessor 34 holds Q11 off while power is being applied to the bus 14. As illustrated with reference to FIG. 5, the transceivers 18 are powered by current flowing through a diode D1 that charges a storage capacitor C1. Power is distributed to the microprocessor 36 of the transceiver 18 and to the current transmitter circuit of Q1 and Q2 of the transceiver. Once power has been established, the controller 12 will begin to create the time slots 26 earlier described with reference to FIGS. 2A–2C in which data as logical bits 30, 32, by way of example, from the transceiver 18 to the controller 12. During the time slot 26, power is not applied to the bus 14. The transceivers 18, as herein described by way of example, are powered by the stored charge in the capacitor C1 illustrated in FIG. 5 when the time slots 26 are being created.

During operation, and with reference again to FIGS. 3–5, the time slot 26 is created through the following events. The controller turns off Q12 and Q10 and turns on Q11 for terminating the bus 14. A delay time allows for the unterminated ends of the bus 14 to reflect back to the controller 12. The controller asserts a DC restoration clamp pulse signal 38 from Q20 (see FIG. 4) which sets the waveform 22 to a set reference point 40, as illustrated with reference again to FIGS. 2A–2C. This provides a known threshold level for Q21, nominally much less than the supplied voltage of the pulse delivering the power. The controller 12 essentially decouples incoming data leakage currents, decoupling with AC and restoring Dc with a clamp. With reference again to FIG. 5, using Q1 and Q2, the transceiver 18 asserts a regulated current pulse signal 42 on to the bus 14 and across the terminator resistor 44 of the controller 12 (see FIG. 3). The current across the terminator resistor 44 creates a voltage waveform which is detected by Q21 and sent to the microprocessor 34 of controller 12 as a data bit, the logical one 30 or logical zero 32 earlier described with reference to FIGS. 2B and 2C. By way of example, the current pulse 42 asserted by the transceiver 18 is pulse width modulated such that a pulse ¼ of the time slot 26 is equal to the logical one 30 and a pulse equal to ½ of the time slot, or until the end of the time slot, equals a logical zero. In this way, the controller 12 can detect when the transceiver 18 is not responding. As herein illustrated, the data is inserted after the clamping as earlier described. Further, it will be appreciated by those skilled in the art that multiple bits may be inserted within a preselected time slot as desired by the user and needed function to be performed.

The end of the time slot 26 is created after a preselected time slot period. The controller 12 turns on Q12 and Q10 that then provides power to the bus 14. Q11 is turned off for removing the terminator 44 from the bus 14.

Figure 6:
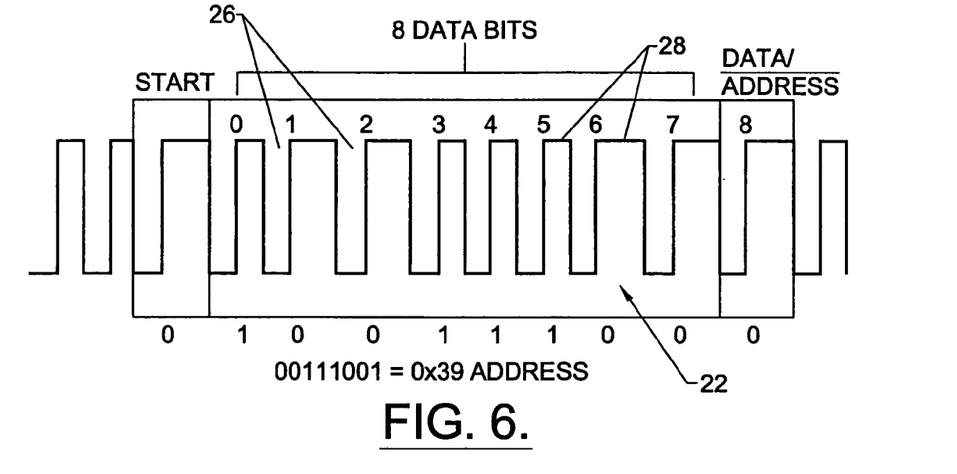
FIG. 6 is a bit stream illustrating a transmitted byte during a data mode operation of the embodiment of FIG. 1.
Figure 7:
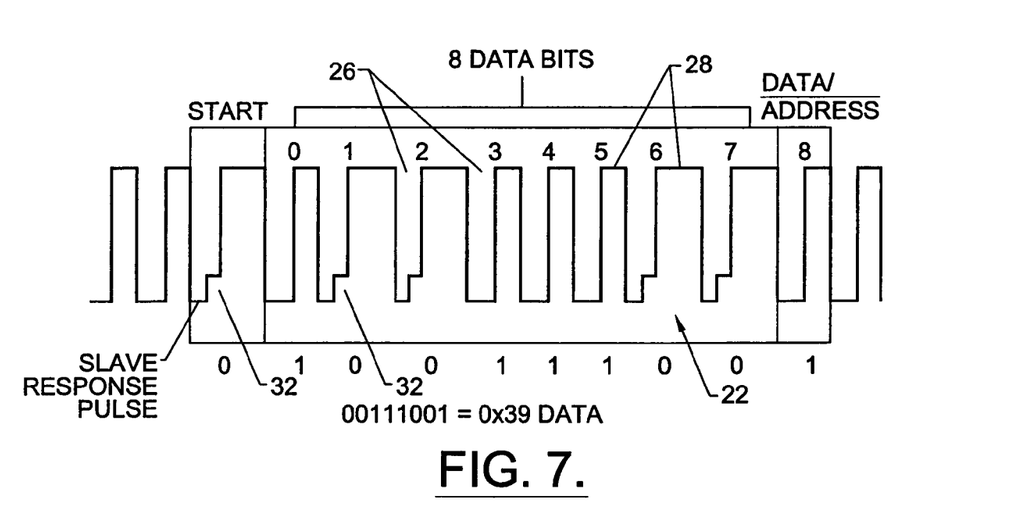
FIG. 7 is a bit stream illustrating a received byte during a data mode operation of the embodiment of FIG. 1.

By way of example with respect to the operation of the embodiment herein described for the present invention, a data mode of operation is identified and used for communication with a selected transceiver 18 for accessing the transceiver and programming its function. Each of the other transceivers 18 "look" for instruction bytes and see the byte as pulse width modulated bits to start a data stream. By way of example, reprogramming of transceiver addresses may be accomplished during the data mode. The data mode gets the transceiver ready to listen to the controller. As herein described by way of example, a ten bit transmission scheme is used during the data mode, with a single low bit indicating a start bit, as illustrated with reference to FIG. 6. The eight bits that follow the start bit are data bits defining a byte, and are sent LSB first. The ninth bit is used to distinguish between data bytes and address bytes. By way of example, address bytes are indicated by a low ninth bit, with data bytes indicated by a high ninth bit. With reference again to FIG. 1, a computer 46 may communicate with the controller 12 for providing the initializing programming and monitoring functions, by way of example. The controller 12 includes a communications port 47 such as an RS-232 port for interfacing with the computer 46. As will be understood by those skilled in the art, any of a variety of communications links, such as a USB or Ethernet connections may be used for interfacing with the computer 46. For the embodiment of the invention herein described by way of example, the communications port of the controller generally operates at 38400 baud. Any byte sent from the computer 46 to the controller 12 will be transmitted onto the bus 14 for reading by the transceiver 18. Any byte, as illustrated with reference to FIG. 7, received from the transceiver 18 will be transmitted by the controller 12 to the computer 46.

Another mode of operation includes a multiplex mode, a streaming mode, where the controller 12 sends a multiplex command followed by a stream of power pulses 28 and time slots 26 as earlier described with reference to FIGS. 2A–2C. Each transceiver 18 is given a designated slot position with a preprogrammed number of time slots. The controller 12 echoes the data that it reads from a time slot on the next occurring power pulse to allow any transceiver within the system 10 to use the data being transmitted. At the end of a data stream, or at the end of a broadcast cycle, the system returns to the data mode earlier described, and waits for the next multiplex command.

The system 10 thus provides a full duplex operation with bi-directional communication between the controller and the transceivers, thus the input/output devices. By way of example, data integrity may be checked by an initiating input transceiver, errors reported at the end of a broadcast cycle, and an output transceiver can then use the data as appropriate for the device and condition being monitored or controlled. In summary, the controller 12 broadcasts data in both the data mode and multiplex mode of operation. The controller 12 generates a pulse width modulated stream by applying a power pulse then a time slot repetitively, as earlier described. The transceiver 18 reads bit information from the bus 14 by comparing the length of the time slot 26 to the length of the power pulse 28. The controller 12 will vary the length of the on time to provide different bit values. By way of example, if two pulses have the same length, a high bit value is read. If the power pulse is 1.5 to 2.3 times as long as the time slot, by way of further example, a low bit value is read. By way of further example, if the width of the power pulse is equal to the width of the time slot, a first logical bit value such as one will be interpreted, and if the power pulse width is unequal to the time slot width, a second logical bit value such as zero will be interpreted.

The transceiver 18 transmits to the controller 12 by sourcing a current pulse onto the bus 14 during the intervals of the time slot 26, which is transparent to the other transceivers in the system but can be read by the circuitry of the controller 12. With reference again to FIG. 5, illustrating transceiver circuitry, the Zener diode Z1, and the resistors R1 and R2, provide the circuit elements for this function. The Zener diode is selected so that it does not conduct when the transceiver 18 is transmitting to the bus 14, but does conduct during the power pulses 28. The resistors R1 and R2 scale the power pulse to an appropriate input level for the microprocessor 36.

Figure 8:
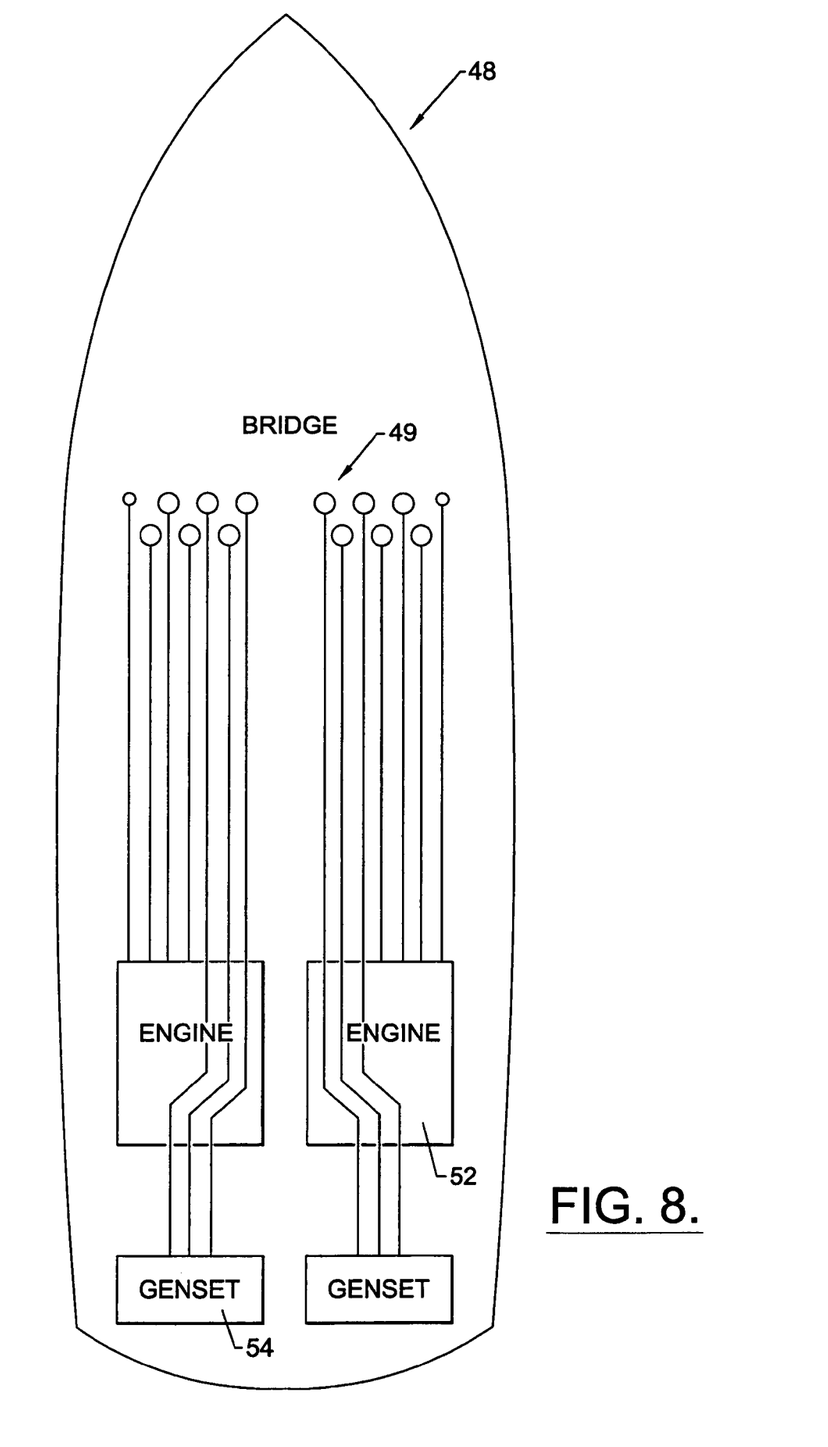
FIG. 8 is a partial diagrammatical view of a typical monitoring and control system for an engine and generator operable with a power boat.
Figure 9:
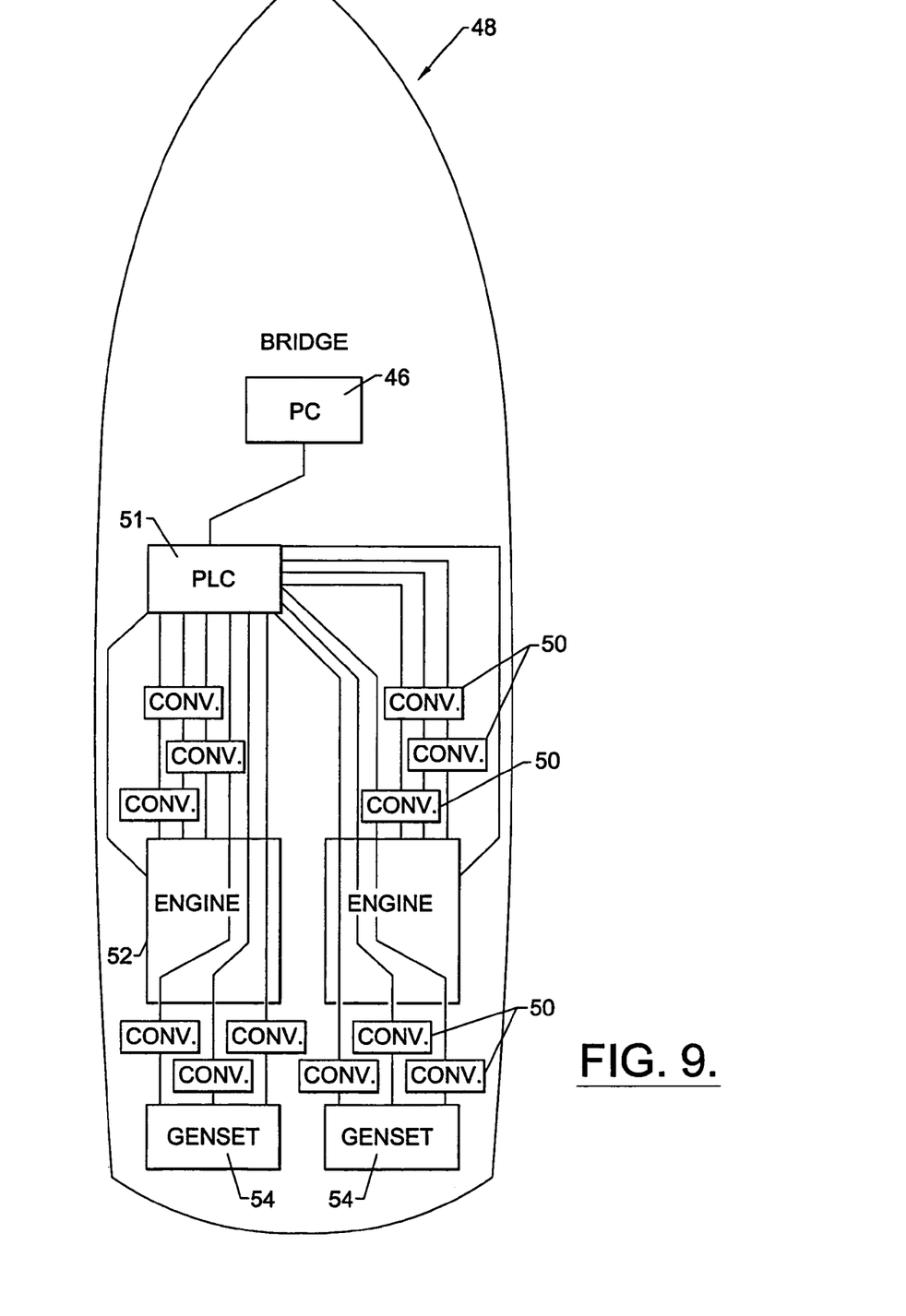
FIG. 9 is a partial diagrammatical view of a typical monitoring and control system employing semiconductor technology and signal converters for an engine and generator operable with a power boat.
Figure 10:
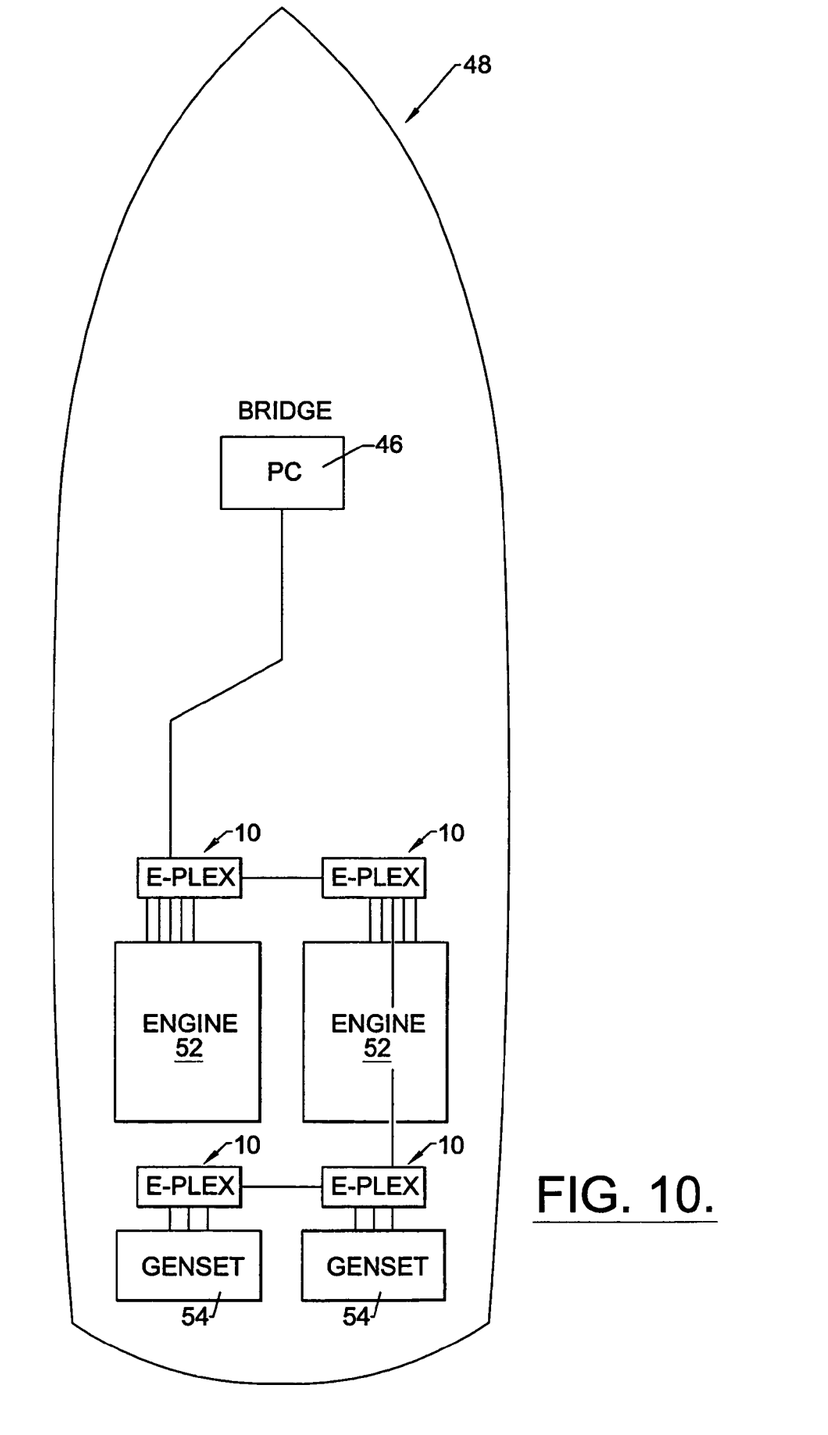
FIG. 10 is a partial diagrammatical view of one embodiment of the present invention illustrating one use of the present invention for monitoring performance of an engine and generator operable with a power boat.

By way of example, consider use of the present invention with a marine vessel 48 for controlling and monitoring electrical equipment onboard as herein described with reference to FIGS. 8–10. The system 10 above described may be employed to control gensets, security, multimedia, sonar, lighting and monitor a GPS and engine information, by way of example. As illustrated by way of example, with reference to FIG. 8, marine controls typically evolved from simple mechanical engine controls to wires and switches 49 with each device having a separate set of controls and wiring. As the vessel added more systems, bundles of wiring became increasingly more bulky. In addition to the high cost to add or change a system, some controls could not be added because of limited access. With advances in electronics, control and monitoring became more sophisticated, as illustrated with reference to FIG. 9, but problems with bandwidth and protocols means slow communications and a limited number of devices on a monitoring and control system. Typically, lack of compatibility between the multitude of devices used on the vessel necessitated using converters 50. Further, a programmable logic controller (PLC) 51 used with the system must be centrally located since separate wires must be run from each control function to the PLC. As is known in the art, such systems and system installation is costly and only partially reduces the amount of wiring needed when compared to systems earlier described with reference to FIG. 8. In comparison with the present invention, one system 10 can be attached to one engine for monitoring functions of interests on that engine, such as temperature, pressure, RPM, and the like. Several hundred devices may be connected to one system 10 for controlling and monitoring the equipment of interest, such as the engine 52 or genset 54 as illustrated by way of example only with reference to FIG. 10, and without the need for additional converters, sensors or relays, as is typical in the art. Further, the system 10 will operate even when the computer 46 "crashes."

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

That which is claimed is:

1. A communications and control system comprising:
   a transceiver for transmitting and receiving an electrical signal; and
   a controller operable with the transceiver for controlling power and data delivered thereto, wherein the power to the transceiver is controlled through a waveform having a plurality of pulses separated by a time slot with the power delivered with each pulse and absent during the time slot for transmitting data therein, and wherein the controller provides control data signals to the transceiver through a pulse width modulation of the waveform, with a first pulse width of the pulse representing a first data value and a second pulse width thereof representing a second data value, the transceiver providing data output within the time slot, and thus full duplex operation with bi-directional communication between the controller and the transceiver.

* * * * *